United States Patent [19]
Barton et al.

[11] Patent Number: 5,124,833
[45] Date of Patent: Jun. 23, 1992

[54] ELECTROCHROMIC SYSTEM WITH LESS THAN 30 SECONDS SWITCHING TIME

[75] Inventors: James Barton; Francois Lerbet, both of Paris, France

[73] Assignee: Saint-Gobain Vitrage, Courbevoie, France

[21] Appl. No.: 551,224

[22] Filed: Jul. 11, 1990

[30] Foreign Application Priority Data

Jul. 11, 1989 [FR] France .................. 89 09283

[51] Int. Cl.⁵ ............................................ G02F 1/01
[52] U.S. Cl. ............................... 359/269; 359/275; 359/273
[58] Field of Search ............... 350/355, 357; 359/269, 359/273, 275

[56] References Cited

U.S. PATENT DOCUMENTS

| | | | |
|---|---|---|---|
| 4,346,964 | 8/1982 | Ishihama | 350/357 |
| 4,801,195 | 1/1989 | Kawai | 350/357 |
| 4,807,977 | 2/1989 | Sammells | 350/357 |
| 4,824,221 | 4/1989 | Endo et al. | 350/357 |
| 4,844,591 | 7/1989 | Arribart | 350/357 |
| 4,865,428 | 9/1989 | Corrigan | 350/357 |
| 4,902,110 | 2/1990 | Green | 350/357 |
| 4,927,246 | 5/1990 | Ito et al. | 350/357 |

Primary Examiner—Rolf Hille
Assistant Examiner—Mahshid Saadat
Attorney, Agent, or Firm—Pennie & Edmonds

[57] ABSTRACT

The invention relates to an electrochromic glazing consisting of two glass sheets (1, 4) coated with first and second transparent electroconductive layers (2, 5), separated by a layer of an electrochromic material (9), an electrolyte (8) and a counterelectrode (7), said transparent electroconductive layers (2, 5) each being provided with an electroconductive strip (3, 6) parallel to the length of the glazing, made of a material whose electric conductivity is high relative to that of transparent electroconductive layers (2, 5). The electroconductive strips (3, 6) are placed along the opposite edges of the glazing and are connected to a voltage generator which applies in coloring phase (or in fading phase), between two points A and B on the electroconductive strips (3, 6) a potential difference $U_1=(V_A-V_B)$ (t) so that between point A on the electroconductive strip on the first electroconductive layer and a point R on the second electroconductive layers, directly facing point A, there is a potential difference $U_2=(V_A-V_R)$ (t) $=U_o$, where $U_o$ is constant and chosen from the stability range of the coloring (or fading) reaction.

20 Claims, 2 Drawing Sheets

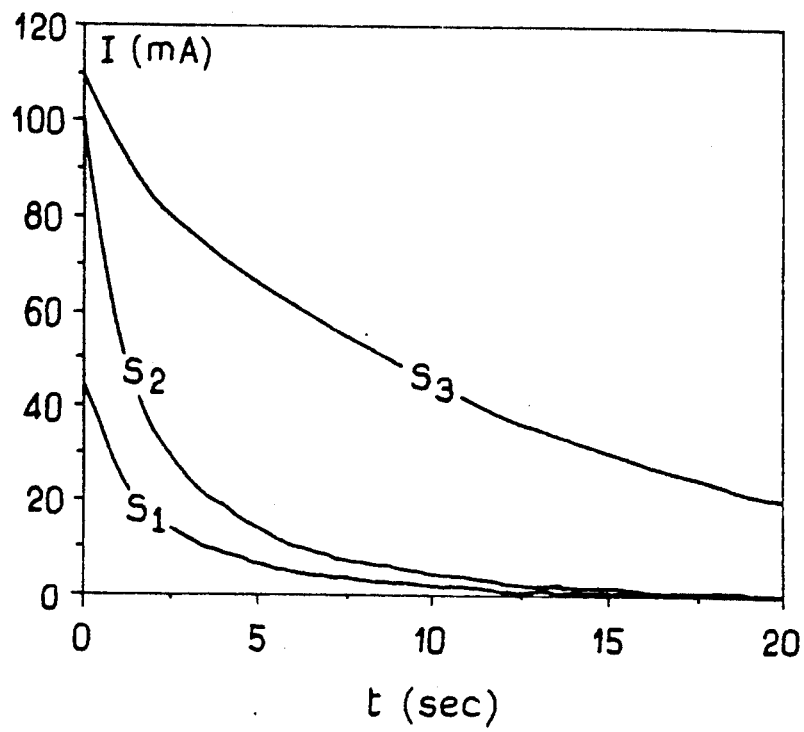
FIG_3
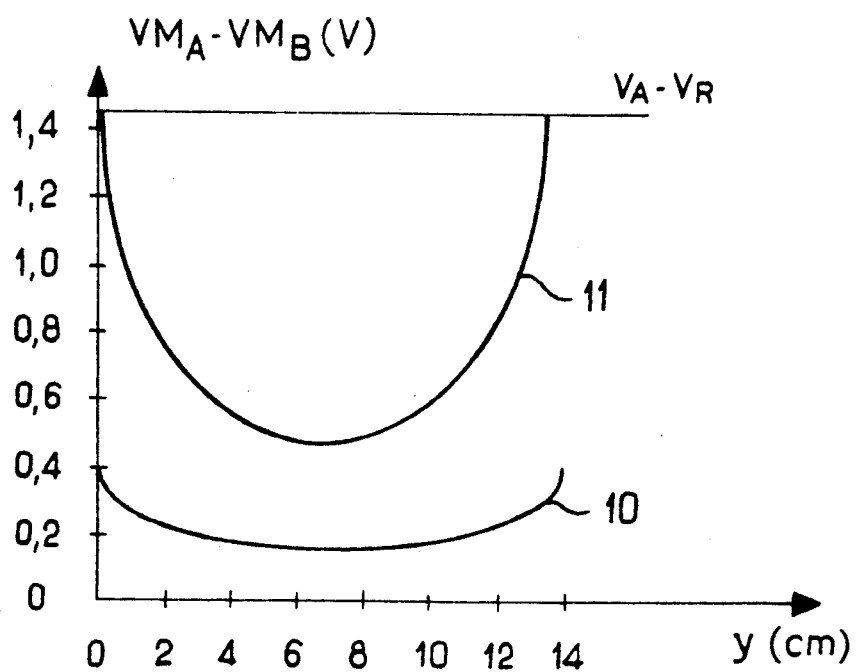
FIG_4

ELECTROCHROMIC SYSTEM WITH LESS THAN 30 SECONDS SWITCHING TIME

BACKGROUND OF THE INVENTION

The invention has as its object an electrochromic system, in particular a transmission glazing of the electrochromic type or more precisely a laminated glazing whose light transmission is modified by application of an electric potential to the terminals of the glazing. The glazings according to the invention are used to control the solar lighting in a building or in the passenger space of a motor vehicle, in particular a vehicle equipped with a glass roof.

From patent applications EP-A-253713 and EP-89400814, a laminated electrochromic glazing is known which consists of two glass sheets coated with transparent electrically conductive layers—for example, indium oxide layers doped with tin (ITO)—separated successively by a layer of a cathode electrochromic material such as tungsten oxide ($WO_3$), an electrolyte with proton conduction—for example, an electrolyte of orthophosphoric acid ($H_3PO_4$) which has been uniformly dispersed in a poly(ethylene oxide) (PEO) film, and a layer of an anode electrochromic material such as iridium oxide. The two layers in contact with the electrolyte are capable of reversibly inserting protons if a suitable potential difference is applied to the two opposite ends of the glazing, the insertion reaction in the tungsten oxide layer corresponding to a deinsertion reaction in the iridium oxide layer which thus plays the role of a symmetrical counterelectrode of the tungsten. The thermodynamic balances can be written in the following manner:

$$WO_3 + xH^+ + xe^- \longrightarrow H_xWO_3$$

and $$H_xIrOy \longrightarrow IrOy + xH^+ + xe^-$$

The instantaneous measurement of intensity I of the current which goes through the glazing is therefore a direct measurement of the number of insertion/deinsertion reaction sites which occur at this same time.

The applied potential difference should be greater, in absolute value, than the difference of the thermodynamic potentials of the insertion or deinsertion reaction of the protons. The greater the applied potential difference, the faster the coloring—or the fading—will be. However, beyond a certain voltage, there is the danger of noise occurring, particularly the reduction of molecular hydrogen of the proton or the oxidizing into oxygen of the water present in the residual state in some layers.

Taking into account the excess voltages in the interfaces, the limits of electrochemical stability characteristic of the system described above are between 0.6 and 1.5 volts in coloring phase (insertion of protons in $WO_3$, deinsertion in $H_xIrOy$) and between $-0.6$ and 0 volt in fading phase. In this description, these limits are designated below as "electrochemical stability range of the coloring and fading reaction."

The second problem which is posed is the time necessary to obtain a desired coloring or fading, i.e. on the assumption of a maximum coloring/fading, the time necessary for the passage of the amount of charge corresponding to all the potential reaction sites, or, in other words, the time necessary so that intensity I of the current to be reduced to zero—or at least to a value close to zero.

When the size of the glazing increases, the amount of charge that must pass correspondingly increases. However, the intensity of the current cannot increase proportionately because the ohmic drops in large size glazings become a factor limiting the current and consequently the coloring/fading rate with resulting increases in switching times.

While it is desirable to minimize the ohmic drop in a cell operating in transmission—which assumes transparent electroconductive layers—it is not possible to choose materials whose resistance per square is less than, for example, 1 ohm. The best high-performance materials and deposition techniques to date make possible only the production of layers of 2 to 5 ohms of resistance per square. It is possible, however, to obtain some relief from this requirement by using power lead-ins which are not pinpoint but consist of strips or electroconductive wires running along two opposite sides of the cell, masked by a sealing bead forming a framing around the glazing. These strips or wires can be chosen from a very conductive material such as copper, so that all the points of the same strip are equipotential.

In practice, as soon as the distance between the two electroconductive strips exceeds 10 cm, for example, the switching time of a glazing is greater than a minute.

This switching time can be reduced by dividing the glazing into many smaller glazings. Thus, for a glazing of a width W and an electroconductive strip at ordinate $y=0$ and a second strip at ordinate $y=W$, the glazing could be subdivided by locating strips at ordinates $y=\frac{1}{3}W$ and $y=\frac{2}{3}W$ by alternating the contact faces. The cell then formed is equivalent to a unit of 3 small identical cells assembled in parallel, each small cell having a resistance three times smaller and an improved switching time. But such an assembly leaves a network of electroconductive strips visible which interferes with the general appearance of the glazing.

What is true of the electrochromic glazings operating in transmission is also true of other electrochromic systems of the display or mirror type which necessarily comprise at least one transparent electroconductive layer whose conductivity is relatively low in comparison, for example, with a thick metal layer.

Further, whatever the mode of operation of the electrochromic system may be—insertion of protons or other cations or the like, for example, reduction/dissolution of a metal salt—, the same problems linked with these ohmic drops are found.

SUMMARY OF THE INVENTION

The invention has as its object the provisions of an electrochromic system whose switching time from a colored state to a faded state and vice versa is less than 30 seconds even if the dimensions of the glazing are large, such as, for example, on the order of 50 cm, which corresponds to the dimensions of the glazings of buildings or of motor vehicles.

This technical problem is solved according to the invention by a system comprising two glass sheets coated with electroconductive layers, separated by a layer of an electrochromic material, an electrolyte and a counterelectrode. The electroconductive layers are each provided with an electroconductive strip made of a material whose electric conductivity is great relative to that of the electroconductive layers, the electroconductive strips being placed along the opposite edges of the glazings and connected to a voltage generator. In the coloring phase (or in fading phase), the voltage generator applies between 2 points A and B in the immediate vicinity to the electroconductive strips, a potential difference $U_1 = (V_A - V_B)(t)$ so that between point A and a point R of the other electroconducive layer, directly facing point A, there is a potential difference $U_2 = (V_A - V_R)(t) = U_O$, where $U_O$ is constant and chosen from the stability range of the coloring (or fading) reaction.

Further, electroconductive strips are advantageously employed as power lead-ins to the electrodes of the system to accommodate the relatively high ohmic drop inherent to the system caused by the large dimensions of the glazing. These electroconductive strips are attached to the electrodes along and parallel to the length of the glazing.

In conventional operation, the potential difference is imposed between two strips A and B, located at two end ordinate points. According to the invention, the potential is imposed between two points having the same abscissa, placed on the same side of the glazing but on different electroconductive layers. In this way, the effective voltage is maximum at time $t=0$ and the appearance of the coloring—or on the contrary its disappearance—is more quickly perceptible to an observer.

It can be noted that the proposed type of voltage supply does not make it possible actually to compensate the ohmic drops. Thus, if a potential difference $U_O$ is imposed on one side of the glazing, except for the ends of the glazing ($y = 0$ or $y = 1$), two points facing one another always have between them a potential difference $V(y)$ less than the voltage imposed. However, it is found experimentally that this value $V(y)$ is always greater than value $V'(y)$ obtained when $U_o$ is imposed between two end strips of glazing $U_1 = U_O$, consequently, the maximum coloring is attained much more quickly, and an overall response time on the order of 30 seconds can be attained for glazings of, for example, $(40 \times 80)$ cm$^2$.

Relative to the electrochromic glazings known in the art, a much more marked difference is actually observed with a glazing according to the invention, between the transitory states of coloring of the marginal areas and the transitory state of coloring of the central area of the glazing. Though the value of the effective potential difference between two points of the glazing facing one another depends much more than above on the y position, the effective potential difference is higher than with a glazing according to the art. This has the result of a coloring not quasi-uniform but with a very strong contrast, the edges of the glazings very quickly appearing midnight blue while the coloring of the central part appears only at the end of the switching time. But, of course, from this time, the tint of the glazing is perfectly uniform.

According to a first embodiment of the invention, what potential difference $U_1$ should be applied at time t to obtain a potential difference $U_2$ constant over time is determined by prior voltammetric recordings. With these values determined, it is sufficient consequently to program the voltage generator.

To simplify this programming, curve $U_1 = f(t)$ can be approximated by an exponential function, which simplifies the electronics associated with the voltage generator but does not eliminate the necessity for tests of true magnitude, to be repeated for each glazing model, to determine the parameters of the exponential function.

To prevent this last difficulty, it is preferable to use an assembly with three electrodes, of the potentiostat type by using, for example, an operational amplifier. A reference electrode then is placed at point R. For a question of balance of the electric charges, whatever the position of this reference electrode may be on straight line $y = 0$, all the points of this straight line are equipotential. Consequently, the reference electrode equally can consist of an electroconductive strip covering the entire length of the glazing (and therefore identical with the strip forming electrode A) or only a part of the latter.

When reference electrode R consists of an electroconductive strip of the length of the glazing, one of two glass sheets advantageously is provided with two electrodes assembled on two parallel edges. This assembly then can be used, moreover, to eliminate another handicap of the electrochromic glazings, namely that the kinetics of the reactions can be very low at low temperature and particularly for temperatures less than 10° C. In this case, the transparent electroconductive layer located between these two electrodes can be used as a heating layer, thanks to the release of heat —due to the resistance of said layer—which occurs when a potential difference is applied between these two electrodes. Preferably, the potential difference applied for this preheating is greater that 20 volts and on the order of 24 volts, which corresponds more generally to a voltage on the order of 0.5 volt per centimeter of distance between the electrodes. This preheating phase can, for example, precede any coloring and can be a duration on the order of 2 mm. Taking into account the vicinity of the second glass sheet, the latter has a tendency to be charged during this coloring phase, which over time causes a blueing which advantageously can be avoided by using an alternating voltage.

BRIEF DESCRIPTION OF THE DRAWINGS

These and other objects, features and advantages of our invention will be more readily apparent from the following detailed description of the invention in which:

FIG. 3 is a graph of the current consumption over time of electrochromic glazings of several different dimensions during a reaction in which they darken; and FIG. 4 is a graph of the voltage between two points $M_A$ and $M_B$ as we move $M_A$ and $M_B$ across the y dimension of the glazing.

DESCRIPTION OF THE PREFERRED EMBODIMENT

Figure 1:
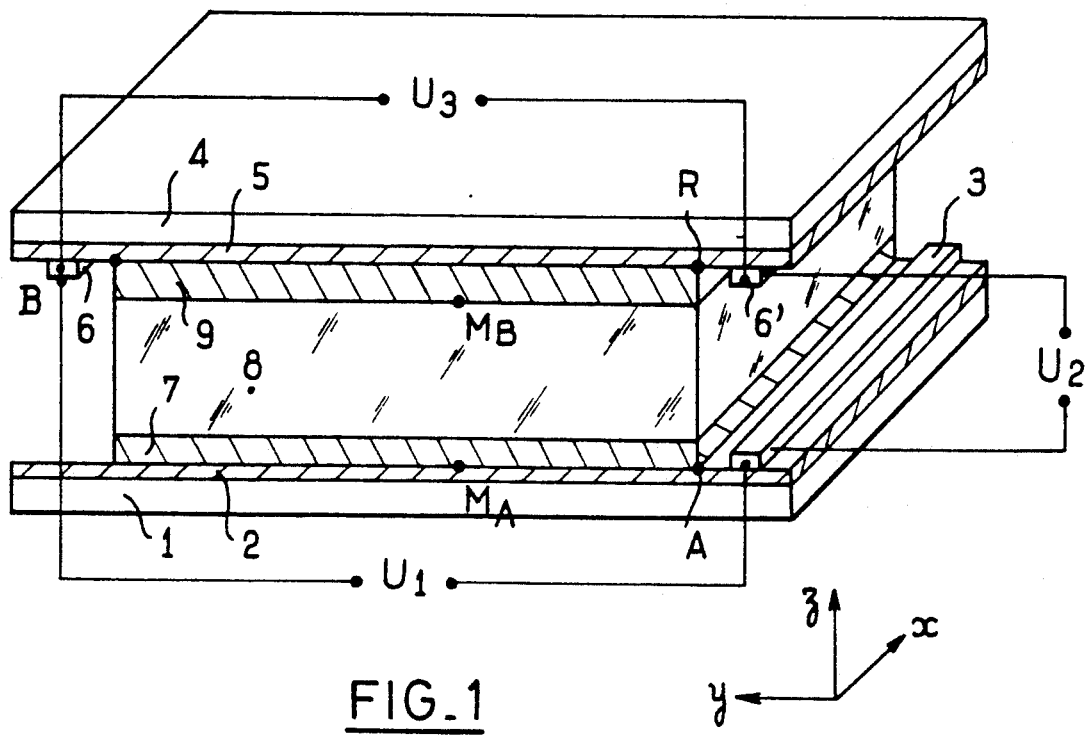
FIG. 1 is a perspective view of the preferred embodiment of the present invention.
Figure 2:
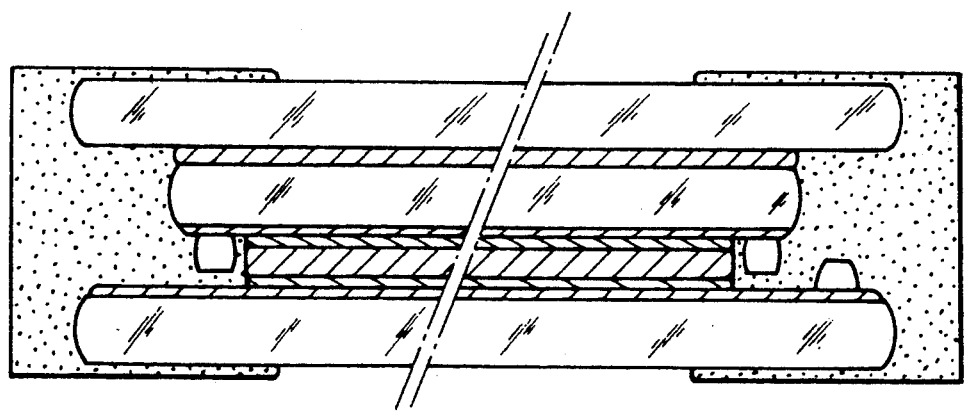
FIG. 2 is a cross sectional view of the preferred embodiment of the present invention as implemented in a roof for an automobile.

An electrochromic glazing is diagrammed in FIG. 1. For the sake of clarity, the ratios of thickness between the various elements of the system have not been respected. This glazing consists of a glass sheet 1 coated with a transparent electroconductive layer 2, provided with a power lead-in strip 3. This strip preferably is parallel to length L of the glazing which moreover is of a width w. Glass sheet 1 faces a second glass sheet 4 which also is coated with a transparent electroconductive layer 5 provided with a power lead-in strip 6. Between two transparent electrodes 2, 5, there are found, successively, a layer 7 of an anode electrochromic material (preferably iridium oxide), an electrolytic layer with proton conduction 8 (preferably a polymer complex consisting of a film of poly(ethylene oxide) with evenly dispersed, and absolutely anhydrous, orthophosphoric acid) and a layer 9 of a cathode electrochromic material (preferably tungsten trioxide).

By way of illustration, layers can be used exhibiting more precisely the following characteristics:

Substrates (1 and 4):

a sheet of float glass of a 3 mm thickness,

Transparent electroconductive layers (2 and 5):

an indium oxide layer doped with tin, deposited by magnetron cathode sputtering having a thickness of 400 nanoemetors, (nm) and a resistance per square of 5 ohms.

Cathode electrochromic layer (9):

a tungsten oxide layer deposited by thermal evaporation in a molybdenum crucible under an air pressure of $5 \times 10^{-5}$ torrs having a thickness of 260 nm.

Electrolytic layer (organic polymer 8):

a solid solution of anhydrous phosphoric acid in poly(ethylene oxide).

Anode electrochromic layer (7):

an iridium oxide layer deposited by cathode sputtering assisted by a magnetic field, under a pressure of 6 millitorrs of an oxygen/hydrogen gas mixture (in an 80-20 ratio) having a thickness of 55 nm. The illustration of FIG. 1 is in a system of Cartesian coordinates (x, y), where the x axis is parallel to the power lead-in strips. For this system, all the points having the same ordinate y are equipotential. On the other hand, two points having the same abscissa x (and a different ordinate) are at different potentials, unless they are equidistant from the median axis which is an axis of symmetry of the cell.

The preparation of the electrolytic layer is as follows. Under rigorously anhydrous conditions, phosphoric acid (17.5 g) standard pure and poly(ethylene oxide) of a molecular weight equal to 5,000,000 are dissolved per liter of solvent (density 1.21, glass transition temperature $-40°$ C., O/H ratio of the number of oxygen atoms of the polymer to the number of hydrogen atoms of the polymer to the number of hydrogen atoms of the acid equal to 0.66).

The common solvent is, for example, a 50—50 mixture of acetonitrile and tetrahydrofuran.

The solution is cast on a glass plate coated with a tungsten oxide layer deposited as indicated above. The uniform thickness is obtained by the film drawing method. The casting is performed under an atmosphere with a controlled humidity level. After evaporation of the solvent, a film of 50 micrometers is obtained whose conductivity at 20° C. is $9.10^{-5}$ ohm. $^{-1}$ .cm$^{-1}$ and whose light transmission is greater than 85%. The humidity level at the time of the casting preferably should be between 40 and 100 ppm which makes it possible to obtain an optimal contrast later.

Preferably, the electrolytic layer is deposited on the tungsten oxide layer in a brief period after the deposit of the latter. The assembly of the glazing is performed in an autoclave at a temperature of 90° C under a pressure of 15 kg/cm$^2$.

The data above is given exclusively by way of example and should not be considered as limiting the scope of this invention which applies to all the electrochromic cells of large dimensions.

The effect of the size of a glazing on current and coloring/fading rate and hence on switching time is shown in FIG. 3 which depicts the variation over time of the intensity of the coloring current for three homothetic cells $S_1$, $S_2$ and $S_3$ whose power lead in strips are spaced apart by 3, 4.5 and 9 centimeters, respectively. In each instance, a fixed potential difference $V_1$, chosen from the stability range of the desired electrochemical reaction, is imposed between point A—which can be considered as a point on electroconductive strip 3—and point B—which can be considered as a point on electroconductive strip 6. For the two small cells, current $I_o$ at time $t=0$ is proportional to the surface and the coloring time is almost identical. Moreover, after 5 seconds, the main part of the coloring process is achieved. On the other hand, with cell $S_3$, it is found that current $I_o$ is not proportional to the surface and is limited by the ohmic drops. In practice, this prohibits the production of a cell whose power lead-in strips are spaced by more than 10 cm—except to accept switching times greater than a minute.

Another way to analyze the problem is to examine two points $M_A$ and $M_B$ which in the (x, y, z) coordinate system diagrammed in FIG. 1 respectively have coordinates (x, y, a) and (x, y, b) respectively. Between these two points, there is a potential difference $V = VM_A - VM_B$ at time t. Further, if electroconductive strips 3, 6 are chosen from copper or any other very conductive material, it can be considered that all points $M_A$—or $M_B$—of a given ordinate y are equipotential. As shown in FIG. 4, curve 10 is representative of various values of V as a function of the ordinate of the pairs of points ($M_A$, $M_B$) for a cell of a 14 cm width (distance A-B) and a potential difference $U_1$ of 1.4 volts and at time $t=0$. It is found that effective voltage V is much smaller than $U_1$, and that this difference is more pronounced for the central zone of the cell.

If it now is chosen to operate according to the invention by maintaining a fixed potential difference $U_2$ between point A and point R facing it on conducting strip 6', a curve 11 drawn for $U_2 = 1.4$ volts is obtained. It is noted that for any pair of points ($M_A$, $M_B$), the observed potential difference V is always less than or equal to $U_2$. For the desired electrochemical reaction, it is necessary and it therefore is sufficient to the impose a value $U_2$ in the so-called electrochemical stability range of the invention. Further, except on the edges, the RMS voltage is not equal to the imposed voltage $U_2$. The invention therefore does not make it possible to be free totally of the ohmic drops. However, the comparison of curves 10 and 11 shows that the RMS voltage according to the invention is about 3 times higher for any pair of points $M_A$, $M_B$. A much quicker coloring—or a fading—results. Moreover, it is found that the effect of the edges is more marked than with a traditional assembly; this is reflected by an almost instantaneous appearance of the color close to the edges of the glazing, but more slowly in the central area. This gradual coloring appearance which "leaves" the edges is characteristic of glazings according to the invention.

For terminals A and B spaced by 14 cm, the gain in coloring time is 6 seconds, or a time gain of 30%. For terminals still further apart, more spaced, the gain also increases. Thus, an electrochromic roof can be made whose smallest length exceeds 30 cm and of which, nevertheless, the switching time is less than 1 minute at 20° C., or in this case a division by 6 of the switching time which typically can be reduced by 3 minutes at 30 seconds.

The assembly according to the invention equips electroconductive layer 5 with two power lead-in strips 6 and 6'. Advantageously, the electric resistance of this layer 5 can be used to heat the cell. For this purpose, before the coloring, a potential difference $U_3$ of, for example, 24 volts, is applied between point B and point R, which makes it possible to raise the temperature for the electrolytic layer for which it is known that the maximum performance data is obtained for a temperature between 20 and 80° C. Potential difference $U_3$ preferably is an alternating voltage to prevent the polarization of the layers of electrochromic materials, with, in this case, for example, an RMS voltage of 24 volts. It should be noted that the heating can be used independently of the oxidation state of the electrochromic layers.

The invention has been described in reference to a cell whose electrolyte has proton conduction but it should be understood that it applies mutatis mutandis to all electrochromic systems, particularly to the cells whose electrolyte has ion conduction, for example in lithium. Also, materials other than those cited can be used for making the electrochromic layer and the counterelectrode, particularly to obtain other tints, the values of the applied voltages having to be adjusted as a function of the new thermodynamic balances. Moreover, an assembly with 3 electrodes can be used more generally in any system requiring at least one transparent electroconductive layer, whatever the systems operating by insertion/deinsertion of ions may be such as those mentioned in this description, the display systems of the systems with an electrochromic gel or also with liquid crystals.

We claim:

1. An electrochromic system comprising of two glass sheets (1, 4) coated with first and second electroconductive layers (2, 5) separated by a layer of an electrochromic material (9), an electrolyte (8) and a counterelectrode (7), said electroconductive layers (2, 5) each being provided with an electroconductive strip (3, 6) made of a material whose electric conductivity is high relative to that of electroconductive layers (2, 5), said electroconductive strips (3, 6) being placed along the opposite edges of the electroconductive layers and connected to a voltage generator which applies in coloring phase (or in fading phase), between two points A and B on the first and second electroconductive layers, respectively, (2, 5) which are in the immediate vicinity of the electroconductive strips (3, 6) a potential difference $U_1 = (V_A - V_B)(t)$ so that between point A and a point R on the second electroconductive layer, directly facing point A, there is a potential difference $U_2 = (V_A - V_R)(t) = U_o$, where $U_o$ is constant and chosen from the stability range of the coloring (or fading) reaction.

2. An electrochromic system according to claim 1 wherein electroconductive strips (3, 6) are of copper.

3. An electrochromic system according to claim 1 wherein the layer of an electrochromic material (9) comprises a cathode electrochromic material such as tungsten trioxide.

4. An electrochromic system according to claim 1, wherein counterelectrode (7) comprises an anode electrochromic material such as iridium oxide.

5. An electrochromic system according to claim 1, wherein electrolyte (8) is an electrolyte with proton conduction.

6. An electrochromic system according to claim 5 wherein electrolyte (8) with proton conduction is a polymer complex consisting of a film of poly(ethylene oxide) with evenly dispersed anhydrous orthophosphoric acid.

7. An electrochromic system according to claim 1 wherein electrolyte (8) is an electrolyte with ion conduction in lithium.

8. An electrochromic system according to claim 1 wherein the potential difference $U_1$ to be applied at time t is determined previously by voltammetric recordings.

9. An electrochromic system according to claim 1 wherein the potential difference $U_1 = f(t)$ is approximated by an exponential function.

10. An electrochromic system according to claim 1 further comprising a third electroconductive strip (6') on the second electroconductive layer in the immediate vicinity of point R and wherein the potential difference $U_1$ is applied so that voltage $U_2$ is constant between the electroconductive strip (3) on the first electroconductive layer and said third electroconductive strip (6').

11. An electrochromic system according to claim 10 wherein the electroconductive strips (6, 6') on the second electroconductive layer are connected to a voltage generator for applying a potential difference $U_3$, which is used for heating the cell when applied voltage $U_2$ is zero.

12. An electrochromic system according to claim 11 wherein the difference $U_3$ is alternating.

13. An electrochromic system according to claim 12 wherein $U_3$ is equivalent to 0.5 volt per centimeter of distance between the electrodes.

14. An electrochromic system comprising:
  two rectangular and parallel sheets of chemically inert transparent material where the north edge and south edge of the sheets are greater than or of equal length to the east and west edges of the sheets;
  first and second electroconductive layers coating the inner faces of the two transparent sheets and separated by:
    a layer of an electrochemical material;
    an electrolyte; and
    a counterelectrode;
  a first electroconductive strip made of a material whose electrical conductivity is high relative to that of the first and second electroconductive layers and connected along the entire length of the north edge of the first electroconductive layer;
  a second electroconductive strip made of a material whose electric conductivity is high relative to that of the first and second electroconductive layers and connected along the entire length of the south edge of the second electroconductive layer;
  a third electroconductive strip made of a material whose electric conductivity is high relative to that of the first and second electroconductive layers and connected along the entire length of the north edge of the second electroconductive layer; and
  a voltage generator which applies in coloring phase (or in fading phase), between two points A and B associated with the first and second electroconductive strips, respectively, a potential difference $U_1 = (V_A - V_B)(t)$ so that between point A and a point R associated with the third electroconductive strip, point R directly facing point A, there is a potential difference $U_2 = (V_A - V_R)(t) = U_o$, where $U_o$ is constant and chosen from the stability range of the coloring (or fading) reaction.

15. A method of varying light transmission in an electrochromic system comprising:

employing an electrochromic system comprising two rectangular and parallel sheets of chemically inert transparent material where the north edge and south edge of the sheets are greater than or of equal length to the east and west edges of the sheets, first and second electroconductive layers coating the inner faces of the two transparent sheets, and separated by a layer of an electrochromic material, an electrolyte, and a counterelectrode, a first electroconductive strip made of a material whose electric conductivity is high relative to that of the first and second electroconductive layers and connected along the entire length of the north edge of the first electroconductive layer, a second electroconductive strip made of a material whose electric conductivity is high relative to that of the first and second electroconductive layers and connected along the entire length of the south edge of the second electroconductive layer, and a third electroconductive strip made of a material whose electric conductivity is high relative to that of the first and second electroconductive layers and connected along the entire length of the north edge of the second electroconductive layer;

applying a potential difference, between points A and B associated with the first and second electroconductive strips, respectively, equal to $U_1 = -(V_A - V_B)(t)$; and maintaining a potential difference, between points A and R, point R associated with the third electroconductive strips, equal to $U_2 = (V_A - V_R)(t) = U_o$, where $U_o$ is a constant and chosen from the stability range of the coloring (or fading) reaction.

16. The method according to claim 15 wherein the potential difference $U_1$ to be applied at time t is determined previously by voltammetric recordings.

17. The method according to claim 15 wherein the potential difference $U_1 = f(t)$ is approximated by an exponential function.

18. The method according to claim 15 wherein the second and third electroconductive strips on the second electroconductive layer are connected to a voltage generator for applying a potential difference $U_3$, which is used for heating the cell when applied voltage $U_2$ is zero.

19. The method according to claim 18 wherein the potential difference $U_3$ is alternating.

20. The method according to claim 18 wherein $U_3$ is equivalent to 0.5 volts per centimeter of distance between the second and third electroconductive strips.

* * * * *